US008146080B2

(12) United States Patent
Carter et al.

(10) Patent No.: US 8,146,080 B2
(45) Date of Patent: Mar. 27, 2012

(54) TESSELLATED VIRTUAL MACHINES CONDITIONALLY LINKED FOR COMMON COMPUTING GOALS

(75) Inventors: Stephen R Carter, Spanish Fork, UT (US); Carolyn B. McClain, Springville, UT (US)

(73) Assignee: Novell, Inc., Provo, UT (US)

( * ) Notice: Subject to any disclaimer, the term of this patent is extended or adjusted under 35 U.S.C. 154(b) by 1210 days.

(21) Appl. No.: 11/731,062

(22) Filed: Mar. 30, 2007

(65) Prior Publication Data
US 2008/0244575 A1 Oct. 2, 2008

(51) Int. Cl.
*G06F 9/455* (2006.01)

(52) U.S. Cl. .......................................................... 718/1

(58) Field of Classification Search ........................ None
See application file for complete search history.

(56) References Cited

U.S. PATENT DOCUMENTS

| | | | |
|---|---|---|---|
| 7,818,515 B1 * | 10/2010 | Umbehocker et al. ........ 711/154 |
| 2002/0174306 A1 | 11/2002 | Gajjar et al. |
| 2003/0169695 A1 | 9/2003 | Salo et al. |
| 2004/0113950 A1 | 6/2004 | Brockway |
| 2004/0225952 A1 | 11/2004 | Brown et al. |
| 2005/0021698 A1 | 1/2005 | Devarakonda et al. |
| 2005/0027754 A1 | 2/2005 | Gajjar et al. |
| 2005/0120160 A1 | 6/2005 | Plouffe et al. |
| 2005/0125513 A1 * | 6/2005 | Sin-Ling Lam et al. ...... 709/220 |
| 2005/0149372 A1 | 7/2005 | Kite et al. |
| 2006/0136912 A1 | 6/2006 | Robinson et al. |
| 2006/0179061 A1 | 8/2006 | D'Souze et al. |
| 2006/0184937 A1 | 8/2006 | Abels et al. |
| 2006/0200477 A1 | 9/2006 | Barrenechea |
| 2006/0259594 A1 | 11/2006 | Paliwal et al. |
| 2007/0027973 A1 | 2/2007 | Stein et al. |
| 2007/0028244 A1 | 2/2007 | Landis et al. |
| 2007/0043860 A1 | 2/2007 | Pabari |
| 2007/0067435 A1 | 3/2007 | Landis et al. |
| 2007/0078988 A1 * | 4/2007 | Miloushev et al. ........... 709/227 |

(Continued)

FOREIGN PATENT DOCUMENTS
WO   WO 2005/020773 A3   3/2005

OTHER PUBLICATIONS

Dynamic Structure in Software Architectures Jeff Magee and Jeff Kramer SIGSOFT '96 1996.*

(Continued)

*Primary Examiner* — Emerson Puente
*Assistant Examiner* — Paul Mills
(74) *Attorney, Agent, or Firm* — King & Schickli, PLLC (57) ABSTRACT

In a computing environment, an association and layout of virtual machines exist as a system of multiple applications instantiated for a common computing goal, such as providing a data center with an email system for an enterprise. In that every application need not always be operational or have applicability in every scenario, applications are only instantiated upon actionable requests for various services. Representatively, a communication channel is initialized between at least two applications, but instantiation of one of the applications is delayed until an actionable request between the applications occurs. In this manner, policy or governance can be enforced and/or computing resources can be conserved. Various features relate to defined incoming and outgoing connectors of virtual machines of the applications and their functional interaction to satisfy initial connectivity issues and to later instantiate needed applications. Libraries, software program products, and policy management are other features, to name a few.

19 Claims, 7 Drawing Sheets

U.S. PATENT DOCUMENTS

| | | | |
|---|---|---|---|
| 2007/0089111 | A1 | 4/2007 | Robinson et al. |
| 2007/0106993 | A1 | 5/2007 | Largman et al. |
| 2007/0250833 | A1* | 10/2007 | Araujo et al. ............ 718/1 |
| 2007/0294364 | A1* | 12/2007 | Mohindra et al. ............ 709/217 |
| 2008/0163171 | A1 | 7/2008 | Chess et al. |
| 2008/0244575 | A1 | 10/2008 | Carter et al. |
| 2008/0256538 | A1 | 10/2008 | Carter |
| 2008/7454569 | | 11/2008 | Kavuri |
| 2008/0307415 | A1 | 12/2008 | Carter |
| 2010/7818515 | | 10/2010 | Umbehocker |

OTHER PUBLICATIONS

Virtual Appliances for Deploying and Maintaining Software Constantine Sapuntzakis, David Brumley, Ramesh Chandra, Nickolai Zeldovich et al. Proceedings of the 17th USENIX conference on System administration Aug. 2003.*

The SmartFrog Reference Manual Hewlett-Packard Development Company Sep. 19, 2005.*

Survivable computing using virtual machines and rolebased management Kyrre Begnum and Mark Burgess Kluwer Academic Publishers Jun. 30, 2004.*

Managing Large Networks of Virtual Machines Kyrre M Begnum 20th Large Installation System Administration Conference 2006.*

Virtual Data Center, An operational, open-source, digital library to enable the sharing of quantitative research data, http://thedata.org/, Mar. 5, 2007, 3 pgs.

Virtual Data Center Tour, http://www.3z.ca/datacenter.asp, Mar. 5, 2007, 3 pgs.

Virtual Data Center-Default Branch, http://freshmeat.net/projects/vdc, Mar. 5, 2007, 2 pgs.

Microsoft, Virtual Server 2005 R2 Product Overview, http://www.microsoft.com/windowsserversystem/virtualserver/, May 14, 2004, 5 pgs.

U.S. Appl. No. 11/811,546 Office Action dated Oct. 28, 2011.

Kyrre Begnum, John Sechrest, Steven Jenkins, Getting More From Your Virtual Machine Consortium for Computing Sciences in Colleges, 2006.

Paul Anderson, Patrick Goldsack, Jim Paterson, LISA '03 Proceedings of the 17th USENIX conference on system administration, Aug. 2003.

VMware Workstation 5 User's Manual, Sep. 16, 2005, http://www.vmware.com/pdf/ws5 manual.pdf.

Steve Tally, "Not So Fast Super Computers,' Say Computer Programmers," Grid Today, www.gridtoday.com/grid/1580796, May 30, 2007, 4 pps.

Kate Green, "The Trouble with Multi-Core Computers," Technology Review, www.technologyreview.com/infotech/17682, Nov. 1, 2006, 4 pps.

"Sled 10 cube," Tectonic, www.tectonic.com.za/graphics/sled 10 cube.jpg, May 29, 2007, 1 pp.

Davy Preuveneers and Yolanda Berbers, Automated Context-Driven Composition of Pervasive Services to Alleviate Non-Functional Concerns, International Journal of Comuting & Information Sciences vol. 3, No. 2, pp. 19-28, Published Aug. 2005.

U.S. Appl. No. 11/894,384 Office Action dated Feb. 3, 2011.

U.S. Appl. No. 11/811,546 Office Action dated Jun. 7, 2011.

U.S. Appl. No. 11/811,546 Office Action dated Jun. 16, 2009.

U.S. Appl. No. 11/784,869 Office Action dated Jan. 20, 2011.

U.S. Appl. No. 11/784,869 Office Action dated Jun. 9, 2011.

U.S. Appl. No. 11/894,384 Office Action dated Jun. 8, 2011.

U.S. Appl. No. 11/811,546 Office Action dated Jul. 12, 2007.

Virtual Center's User Manual Mar. 19, 2004.

Sai Sriniva Dharanilota et al., Manageable Dynamic Execution Environments on the Grid, Jan. 1, 2006Lecture Notes in Computer Science vol. 3011; ISBN 978-3-540-34141-3.

* cited by examiner

TESSELLATED VIRTUAL MACHINES CONDITIONALLY LINKED FOR COMMON COMPUTING GOALS

FIELD OF THE INVENTION

Generally, the present invention relates to computing system environments contemplative of virtual machines assembled to achieve common computing goals, such as providing an email system for a data center of an enterprise. Particularly, it relates to conditionally linking variously tessellated applications of virtual machines. In this regard, tessellated applications establish a computing paradigm for achieving a computing goal according to an entirety of its individual components, while linking to and/or usage of multiple such applications occurs upon an actionable reference being made. Various features relate to incoming and outgoing connectors of virtual machines and their functional interaction to instantiate applications. Other noteworthy features contemplate, managers, libraries, software program products, policy enforcement and corporate governance, to name a few.

BACKGROUND OF THE INVENTION

The processes running in a data center, for example, are rapidly becoming more complex as a result of "virtualization." While virtualizing is solving a myriad of computing problems, the practice is beginning to surface new issues unique to the practice of virtualized data centers having high-density. Further, as regulatory pressures require that data center configurations be certified and regularly re-certified, more and more complex data centers will rapidly overload an enterprise's ability to keep all configurations under control and certified for completeness.

Consider further that single virtual machines are not the end-game in a virtualized data center. Indeed, virtual networks of virtual machines will become more and more prevalent. Consider also an enterprise that has some 50,000 employees with the attendant problems of an email system that large. Rather than configure and maintain a data center with separate email servers, post office servers, IMAP and POP3 servers, SMTP gateways, etc., it would be far easier to have a layout of virtual machines, each caring for one aspect of the email system, linked together virtually and configured to act as the "email system." Then, when the email system is deployed, each component is instantiated as per the "layout" with the data center personnel not worrying about where each virtual machine is located, how it is communicating with other email virtual machines, etc. Additionally, consider that certain applications of the email system are temporary or fleeting, according to policy, perhaps, and need not always be operational or have applicability in every scenario. For example, emails sometimes have attachments or links to applications in need of streaming media services. While it is important that the email system be able to support user's request for the streaming media services, the scenario practically only represents a limited service for users not needed upon every instance of receiving, sending or opening email.

Accordingly, a need exists in the art of data centers, for example, to eliminate inflexibility and cumbersomeness as future needs evolve the center. It further contemplates a paradigm of assemblies of virtual machines to service the functionality of the data center computing goal, or portions thereof. In turn, the paradigm needs robustness to support limited services, such as temporary or fleeting services, but without unduly complicating the application. As with many modern paradigms, such should also embrace governance scenarios and user identity awareness, while simultaneously enabling flexibility, integration with multiple applications and evolving technologies, and monitoring and noticing capabilities, to name a few. Naturally, any improvements along such lines should further contemplate good engineering practices, such as relative inexpensiveness, stability, ease of implementation, low complexity, security, unobtrusiveness, etc.

SUMMARY OF THE INVENTION

The above-mentioned and other problems become solved by applying the principles and teachings associated with the hereinafter-described conditional linking of applications of tessellated virtual machines to achieve common computing goals. In a departure from traditional assemblies of computing arrangements, tessellated applications contemplate an entirety of its individual components (e.g., virtual machines) when addressing computing goals and concerns, not just individual components. As its name implies, tessellation provides an arrangement of applications having essentially no overlap or gaps in functionality which together serve the common computing goal. In that every application need not always be operational or have applicability in every scenario, certain applications are only instantiated when needed, such as upon receipt of actionable requests for various services.

In a representative embodiment, an association and layout of virtual machines exist as a system of multiple applications instantiated for a common computing goal, such as providing a data center with an email system for an enterprise. A communication channel is initialized between at least two applications, but instantiation of one of the applications is delayed until an actionable request between the applications occurs. Various features relate to defined incoming and outgoing connectors of virtual machines of the applications and their functional interaction to satisfy initial connectivity issues and to later instantiate needed applications. Libraries, policy management, managers, and corporate governance are other features, to name a few.

Still other embodiments contemplate computer program products with executable instructions, available as a download or on a computer-readable media, for implementing some or all of the foregoing on one or more physical computing devices.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus for conditionally linking applications of tessellated virtual machines for achieving common computing goals are hereinafter described.

In a basic sense, the entirety is an association and layout of the virtual machines interacting as a system of virtual machines to achieve common computing goals, such as providing an email system for a data center of an enterprise. Various applications of the entirety are conditionally linked to other applications and used only upon the occurrence of an actionable request, such as that dictated by policy, governance or need. Preliminarily, however, all applications initialize their communication channels to satisfy connectivity concerns, but instantiation of one or more applications only occurs thereafter.

Figure 1:
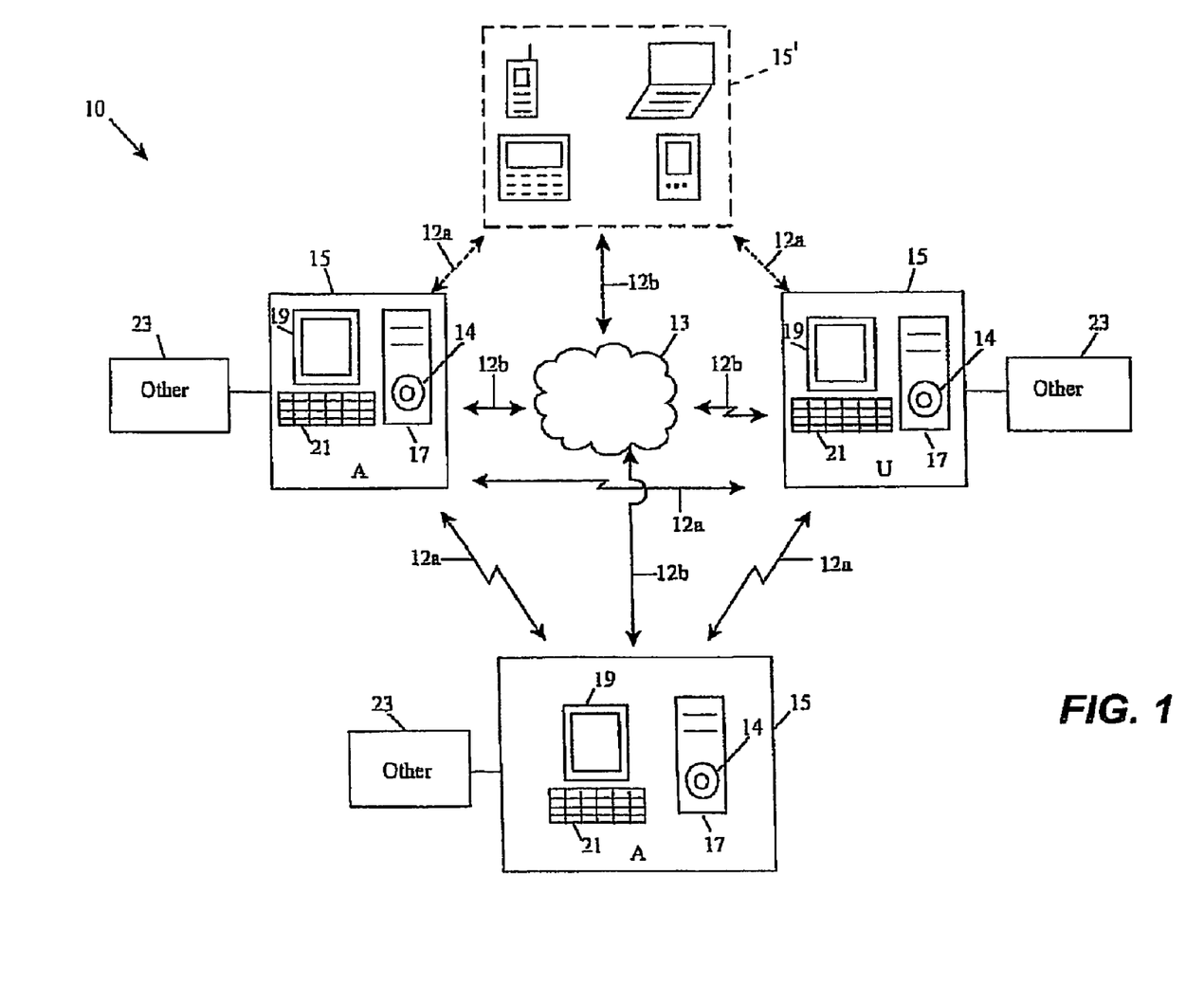
FIG. 1 is a diagrammatic view in accordance with the present invention of representative physical devices in a computing system environment for conditionally linking applications of tessellated virtual machines for common computing goals.

With reference to FIG. 1, a representative environment 10 of physical computing devices 15 or 15' exists per each application of one or more virtual machines, but their physical arrangement or type is largely irrelevant to the invention. In other words, one or more virtual machines may exist per one or more physical computing devices, or as software thereof, but the conditional linking of applications of tessellated virtual machines occurs irrespective of the layout, type or usage of the physical computing devices. Nonetheless, an exemplary computing device typifies a server 17, such as a grid or blade server, or peer-to-peer arrangement, hosting applications, web functions, communications, files, etc. Alternatively, an exemplary computing device includes a general or special purpose computing device in the form of a conventional fixed or mobile computer 17 having an attendant monitor 19 and user interface 21. The computer internally includes a processing unit for a resident operating system, such as DOS, WINDOWS, MACINTOSH, VISTA, UNIX and LINUX, to name a few, a memory, and a bus that couples various internal and external units, e.g., other 23, to one another. Representative other items 23 (also available for tessellating) include, but are not limited to, PDA's, cameras, scanners, printers, microphones, joy sticks, game pads, satellite dishes, hand-held devices, consumer electronics, minicomputers, computer clusters, main frame computers, a message queue, a peer machine, a broadcast antenna, a server (web, application, communication, IMAP, POP, file, etc.), an AJAX client, a grid-computing node, a peer, a virtual machine, a web service endpoint, a cellular phone or palm device, or the like. The other items may also be stand alone computing devices 15' in the environment 10.

In either, storage devices are contemplated and may be remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage. Regardless, storage is representatively provided for aspects of the invention contemplative of computer executable instructions, e.g., code or software, as part of computer program products on readable media, e.g., disk 14 for insertion in a drive of computer 17. Computer executable instructions may also be available as a download or reside in hardware, firmware or combinations in any or all of the depicted devices 15 or 15'.

When described in the context of computer program products, it is denoted that items thereof, such as modules, routines, programs, objects, components, data structures, etc., perform particular tasks or implement particular abstract data types within various structures of the computing system which cause a certain function or group of functions. In form, the computer product can be any available media, such as RAM, ROM, EEPROM, CD-ROM, DVD, or other optical disk storage devices, magnetic disk storage devices, floppy disks, or any other medium which can be used to store the items thereof and which can be assessed in the environment.

In network, the computing devices communicate with one another via wired, wireless or combined connections 12 that are either direct 12a or indirect 12b. If direct, they typify connections within physical or network proximity (e.g., intranet). If indirect, they typify connections such as those found with the internet, satellites, radio transmissions, or the like, and are given nebulously as element 13. In this regard, other contemplated items include servers, routers, peer devices, modems, T1 lines, satellites, microwave relays or the like. The connections may also be local area networks (LAN) and/or wide area networks (WAN) that are presented by way of example and not limitation. The topology is also any of a variety, such as ring, star, bridged, cascaded, meshed, or other known or hereinafter invented arrangement.

Figure 2:
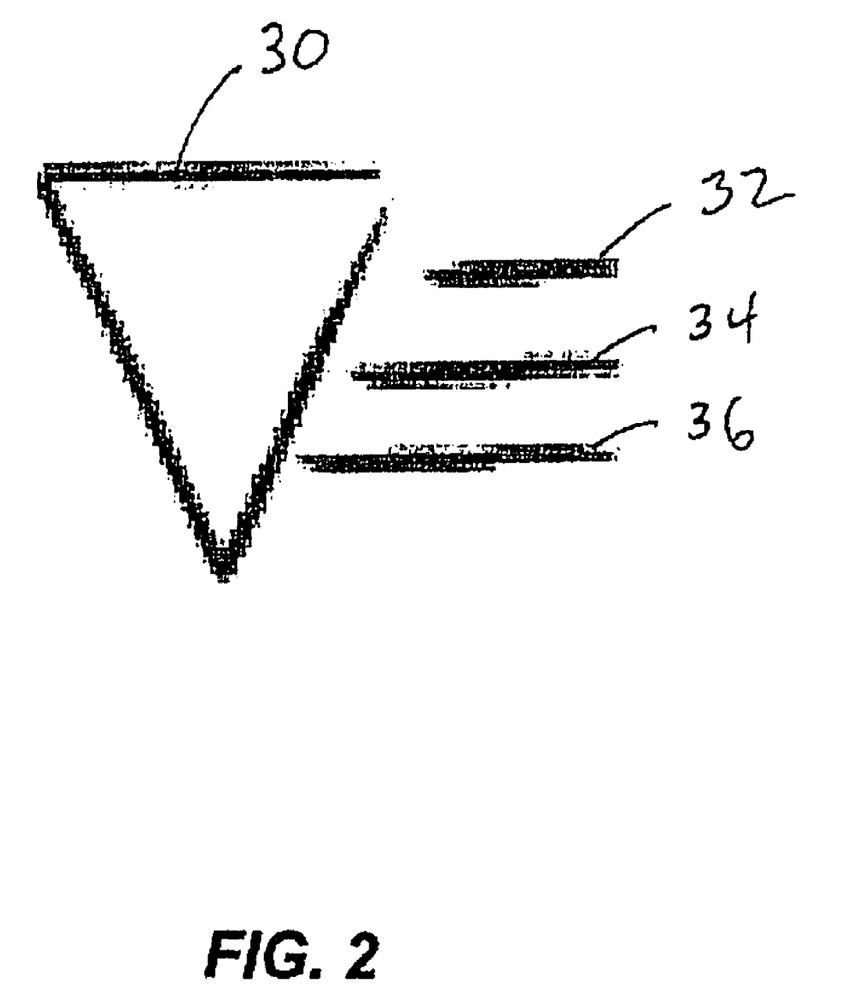
FIG. 2 is a diagrammatic view in accordance with the present invention of a symbol representative of a virtual machine in a computing environment.

With the foregoing representative computing environment as backdrop, FIG. 2 begins the illustration of tessellation. As a matter of convention, however, a symbol or diagram 30, in the form of an inverted triangle, represents a single virtual machine having a role or function in the common computing goal of the pluralities of virtual machines tessellated together. The three lines 32, 34, 36 to the side of the symbol represent the configuration of the virtual machine.

Figure 3:
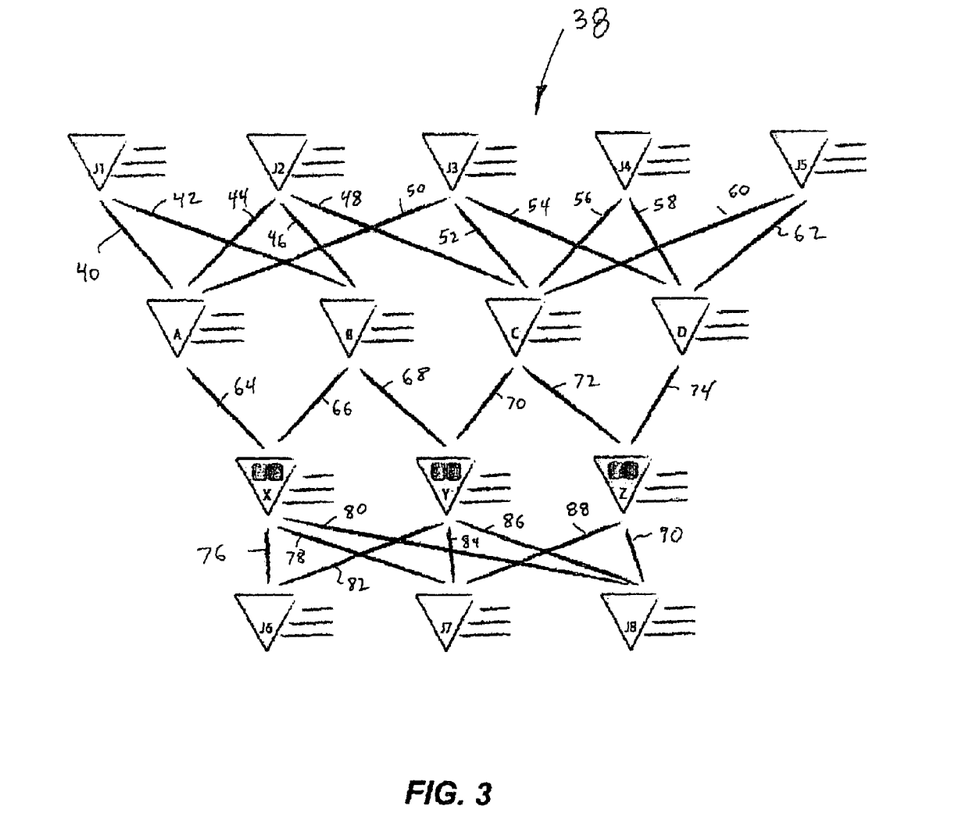
FIG. 3 is a diagrammatic view in accordance with the present invention of an assembly of multiple virtual machines in a computing environment.

For instance, pluralities 38 of individual virtual machines 30 in FIG. 3 are further labeled as J1-J8, A-D and X-Z. The configuration of any one virtual machine for achieving the common computing goal of providing an email system, for instance, might consist of the virtual machines of A, B, C, and D being configured as end-user email servers, while the virtual machines labeled X, Y, and Z are representative of email post offices. The J1 through J8 virtual machines, on the other hand, are representatively various gateways that allow the email system to work (e.g., IMAP, POP, SMTP, Apache, etc.). In turn, the configuration depends upon what role the virtual machine assumes (ultimately dictated by the computing goal objective). That is, if a virtual machine is a POP3 server, its configuration will be that attendant with POP3 functionality and skilled artisans understand its details. Similarly, if a virtual machine is an IMAP4 server, its configuration will be that attendant with IMAP4 functionality and skilled artisans also understand its details. In between the various virtual machines are direct or indirect communication lines 40, 42, 44, 46 . . . 90 externally connecting the various virtual machines in some kind of communication channel that performs some function of the common computing goal, e.g., the overarching email system. (Not shown, however, are communication lines that would connect to a WAN or Internet (left out for clarity).)

Figure 4:
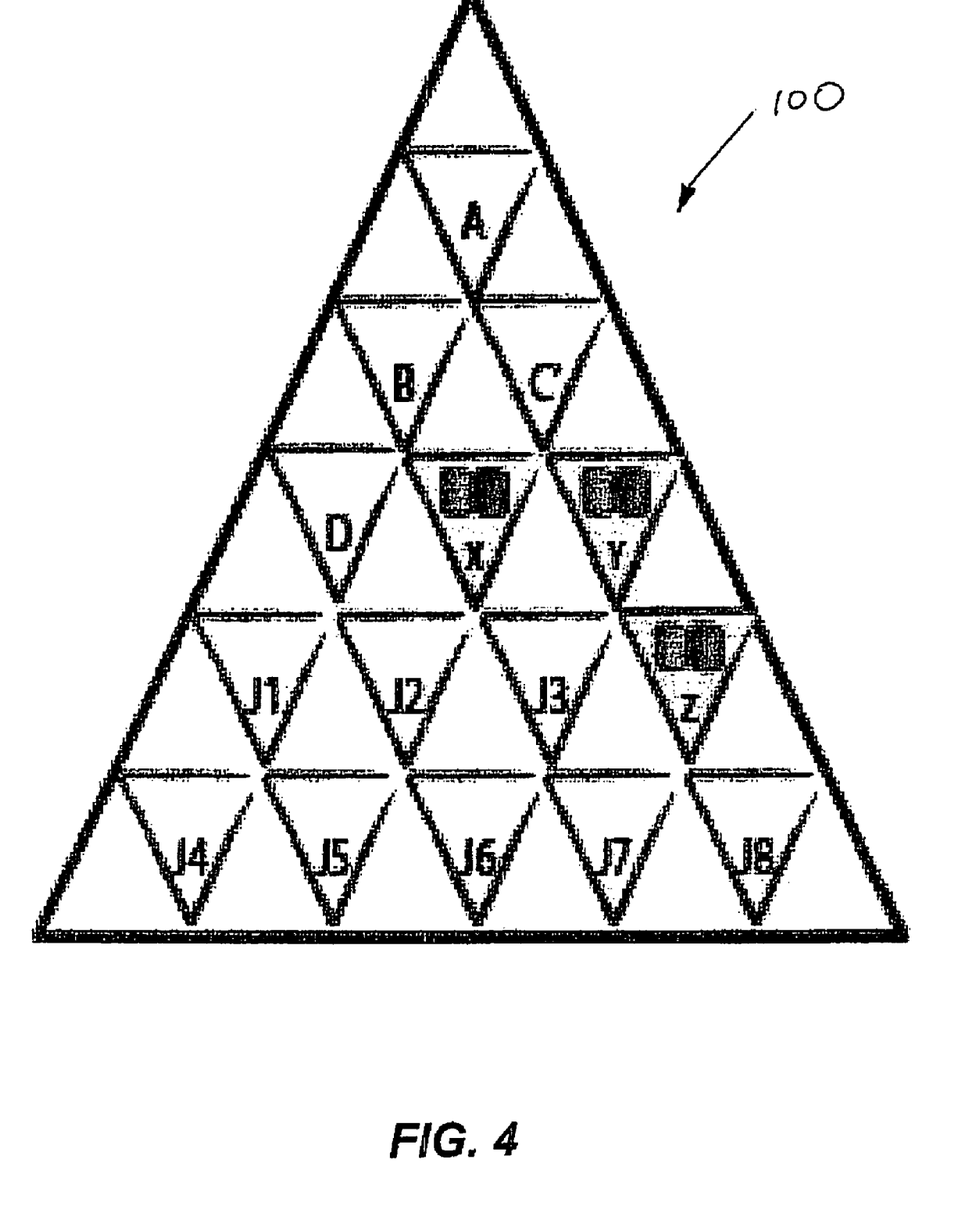
FIG. 4 is a diagrammatic view in accordance with the present invention of a representative tessellated application of virtual machines for achieving common computing goals.

In FIG. 4, a tessellation of the virtual machines for accomplishing the common computing goal exists as generic element 100. In form, it is an application bound together in its entirety that is always considered as an entirety of virtual machines, and not just its individual virtual machine components. In other words, changing only the configuration of virtual machine J3 or virtual machine B is not allowed. Instead, any change or reconfiguration to any part or component of the tessellation 100 requires that the status and functioning of the entire tessellated application be validated and certified for accomplishing the computing goal common to the entirety of virtual machines. In this manner, all of the elements or components needed to instantiate the total tessellated system are held in a single application definition that can be deployed by virtual environment managers.

Figure 5A:
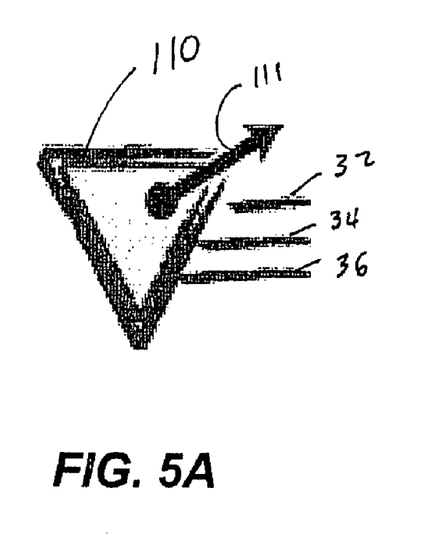
FIGS. 5A and 5B are diagrammatic views in accordance with the present invention of symbols representative of outgoing and incoming virtual machine connectors in a computing environment.
Figure 5B:
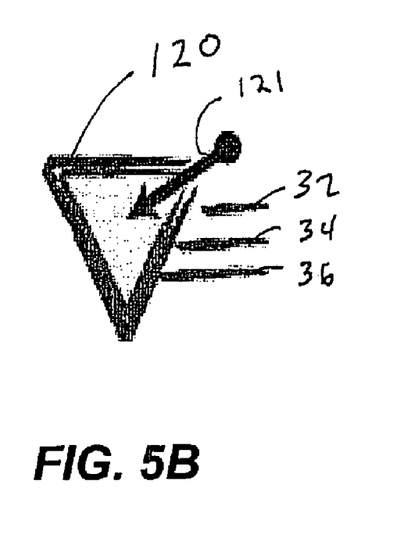

With reference to FIGS. 5A and 5B another symbolic convention consists of symbols 110, 120 in the form of an inverted triangle, representing a single virtual machine having a role or function in the common computing goal of the pluralities of virtual machines tessellated together. Also, a directional arrow 111, 121 provides for the definition of an "outgoing" virtual machine connector pointing the way from one tessellated application to another or an "incoming" virtual machine connector pointing the way of receipt of communication from another application, respectively. Collectively, they serve to illustrate the exit and entry locations of interconnected tessellated applications that altogether serve the common computing goal, but with an appreciation that certain applications are only instantiated upon receipt of actionable requests for various services or to implement policy, for instance.

Figure 6:
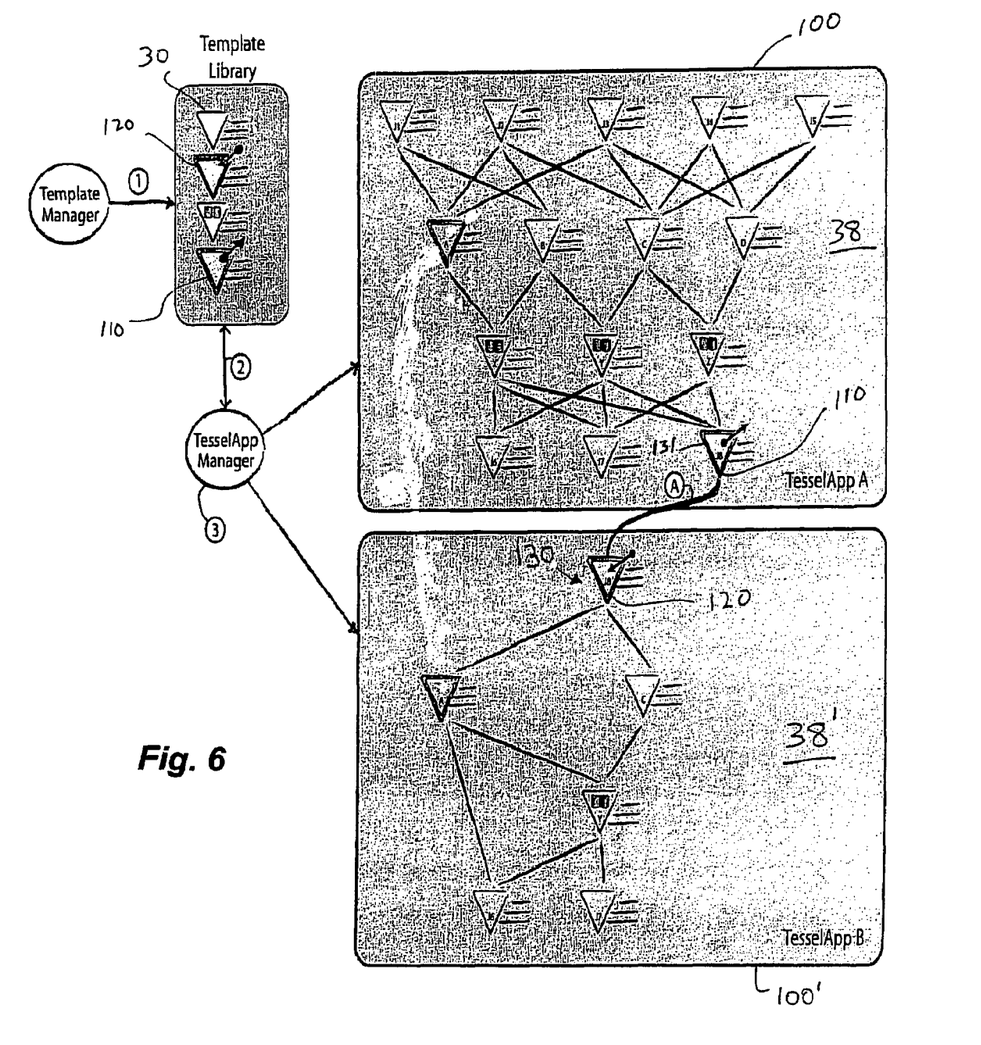
FIGS. 6 and 7 are combination diagrammatic views and flow charts in accordance with the present invention of representative, conditionally-linked tessellated applications of virtual machines in a computing environment to achieve common computing goals.

As an illustration, FIG. 6 shows interconnected applications 100 and 100' of pluralities of tessellated virtual machines 38 and 38', including outgoing and incoming virtual machine connectors 110 and 120 along communication channel A for the virtual machine labeled J8 in each tessellated application. Also, the computing goal of the environment is common to both of the applications, but it is expected that instantiation of application 100' will not occur immediately, but only upon an actionable request later, if at all. The figure is also representative of a system (TesselApp A, 100) which has elements that rely on a policy management and decision system (TesselApp B, 100'). Note that not all virtual machines in TesselApp A require the services of policy management or a PDP (policy decision point). As well, those elements of TesselApp A that do rely on service provided by TesselApp B are not universally used by TesselApp A thus providing the impetus for not instantiating TesselApp B every time TesselApp A is instantiated—but only when an actual policy event needs to be handled. Continuing the earlier email system scenario, application 100 might serve to provide the various IMAP and POP servers, as before, while application 100' might serve to provide media streaming services for certain email in the system. Appreciating that media streaming need not always be operational or have applicability in every email system scenario, it is only instantiated upon an actionable request from application 100. In this manner, policy is reflected and/or computing resources are conserved until needed.

Before then, however, it is desirable to make sure that the applications are properly interfaced and ready to provide service whenever later activities dictate that the second application 100' should be instantiated. To this end, an initialization occurs between the applications that establishes an appropriate communication channel A, but delays instantiation of the second application 100' until needed, or until an actionable request occurs (such as delaying instantiation of virtual machines in application 100' for streaming media services until a request for streaming media services is needed in the email system, to continue the foregoing example).

In more detail, a first mode of operation contemplates a proxy 130 in application 100' for the virtual machine J8 (also element 131) in the tessellated application 100 that handles all requests for initialization and satisfies connectivity issues between the two. In this mode of operation, virtual machine 130 is coded to provide a front or face to the rest of the tessellated application so that the initialization of the applications is successful, but without requiring the instantiation of the tessellated application 100'. During use, upon receipt of an actionable request from the tessellated application 100, the proxy 130 for virtual machine J8 (element 131) then causes the instantiation of the tessellated application 100' for the purpose of providing the services or role associated with its application. In one embodiment, this consists of the proxy 130 performing a proxy initialization procedure for each of the connections it is proxy for so the virtual machine J8 has the necessary connection information needed to operate, when needed (note that a proxy such as Novell's iChain product or Access Gateway could provide much of this functionality excepting the virtual machine specific connection proxy semantics and syntax—e.g., the handling of an https connection using the SSL-izer technology from Novell).

Figure 7:
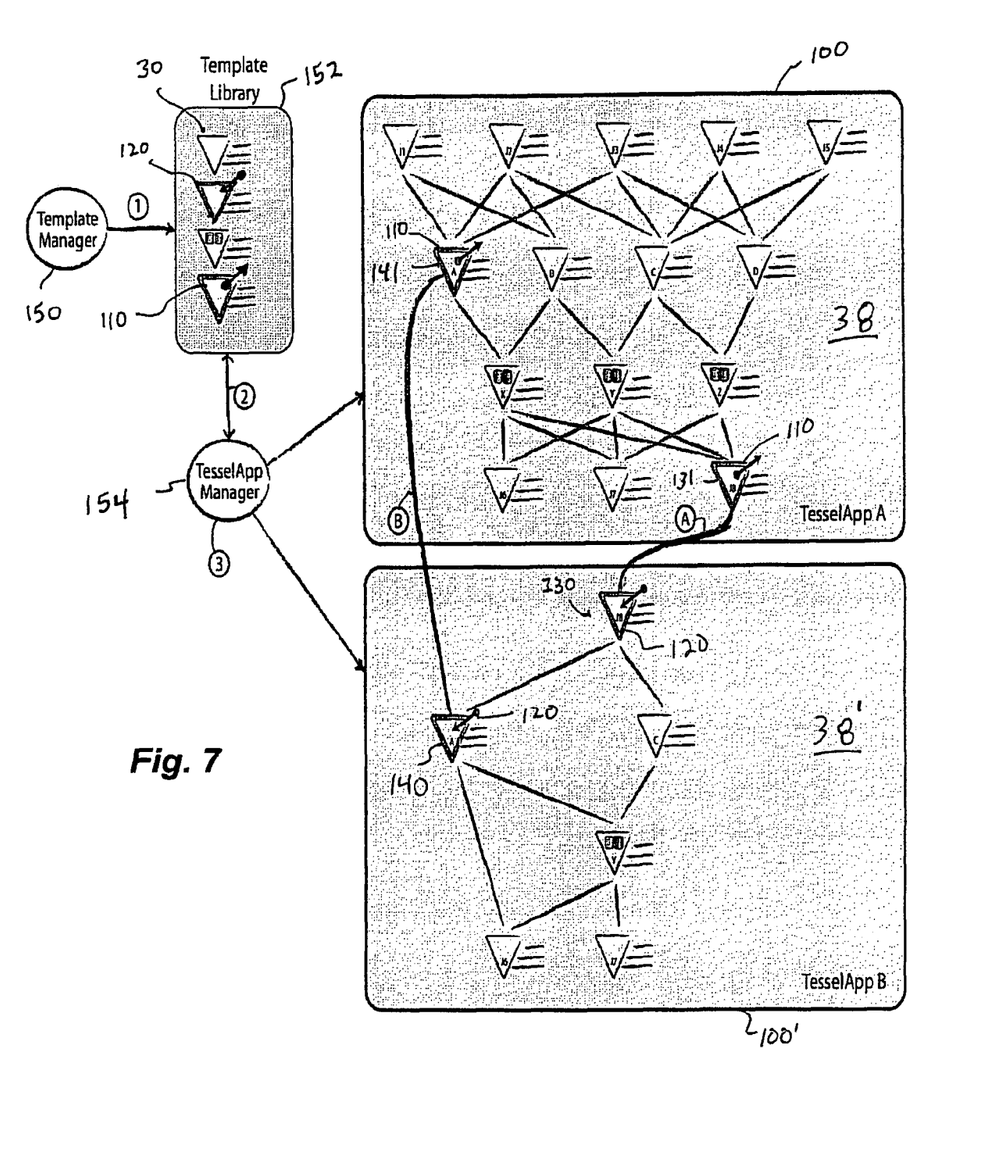

With reference to FIG. 7, the foregoing is extended to illustrate that more than one proxy may exist, such that multiple entry points into the second tessellated application exist. Namely, a proxy 140 for virtual machine A (also element 141) is also given and either or both of communication channels A or B may serve to initially establish and resolve connectivity issues between the applications 100, 100', but without instantiating the second tessellated application 100' until such time as an actionable request is received. In an embodiment, the connection between virtual machine 141 and virtual machine 140 is of an https format along with the exchange of handle information that will allow virtual machine 141 to use tokens to communicate with virtual machine 140 and its services. In this mode of operation, the proxy 130 for virtual machine 131 which is made a part of the tessellated application 100 receives the initialization requests, provides the handles/tokens, and generally provides for the setup between users of virtual machines 131 and 130. Note, however, that this is only for setup or initialization because the proxy 130 is not capable of actually performing policy management or (PDP) dispositioning. Also, this embodiment allows for the instantiation of the tessellated application 100' when any reference is made external to it.

In another mode of operation, the functioning is the same as above except that TesselApp B, 100' is not started by the external references being made to the proxy 130, but rather it is started only when a request is received by the virtual machine 131 from the proxy 130 (or any other source for that matter, note that it is the reference to the non-proxy that is the trigger).

At this point, skilled artisans will appreciate that simply referencing a virtual machine in another tessellated application is common. But, it is the mechanism that solves the referencing issue that is particularly unique in tessellated applications. That is, providing an initialization between the applications that satisfies connectivity issues, for example, but delaying instantiation of an entire application until later, such as upon receipt of an actionable request, is heretofore unknown and provides unique advantage in the art. It is also unique in that the invention provides for the conditional use of a tessellated application even though initialization code may reference it before its actual use.

In still another embodiment of the invention, it is contemplated that the proxy connection (e.g., communication channel A) is monitored by the proxy 130 and, if communication with TesselApp B, 100' is not active during some policy stipulation, the connection (and perhaps the entire application) can be made inoperative until appropriate traffic or policy is realized.

With further reference to FIGS. 6 and 7, a virtual machine template manager 150, such as a system administrator in an enterprise, also exists that defines a virtual machine template for each of the virtual machines of the applications 100, 100' per a role of the common computing goal. As before, this might consist of defining one virtual machine as a POP3 server, while defining another as an email or IMAP server. Also, this functionality includes defining an external connectivity with other virtual machines and may consist of defining various applications that can be run with the virtual machine. Of course, it is well known how a virtual machine can be configured and associated with virtual disks and content in the virtual disk and physical disks and content in the physical disk. This template mechanism adds to that capability by allowing the definition concerning connectivity to other template definitions concerning network connectivity, SAN connectivity, iSCSI connectivity, etc. The intent then is to declare the needed connections so that each template can be fit into a tessellated application 100, 100'.

Once defined, the template per each virtual machine is compiled with other templates in a template library 152 at step 1. From here, certain of the templates are selected (step 2) from the library 152 by a tessellation manager 154. At step 3, the tessellation manager tessellates the system of virtual machines 38, 38' according to the existing objective, e.g., the common computing goal. Continuing the example of an email system of a data center, here the administrator concentrates modeling using the templates and external connectivity specifications of IMAP servers, POP servers, media streaming, etc. and does so according to one or more applications 100, 100'.

Ultimately, the network of virtual machines so arranged to accomplish the computing goal are certified or validated. For this, enterprise governance scenarios are contemplated as are user provisioning roles, to name a few. For example, if governance requires that support for an email system includes both IMAP and POP scenarios, the network of virtual machines are evaluated against the policy. On the other hand, if user provisioning contemplates a manager and employee as two of many potential user roles, and each can only access certain levels of enterprise-wide emails, the network of virtual machines is evaluated for this too. Of course, an infinite number of validation scenarios are possible and the foregoing is only representative. Naturally, skilled artisans will be able to contemplate others.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures or expanding the system to replicate the embodiments multiple times.

The invention claimed is:

1. In a computing environment comprising one or more physical computing devices, a method of assembling virtual machines residing on the one or more physical computing devices together as a system instantiated for a common computing goal, comprising:

configuring pluralities of said virtual machines together as assemblies, each assembly instantiable to provide a tessellated application, wherein said tessellated applications are interconnected to form said system for accomplishing said common computing goal and each virtual machine is configured for implementing a defined role without overlap in functionality with respect to the common computing goal;

conditionally linking at least two applications of said system together, said conditionally linking including defining an outgoing virtual machine of a first application of the system and an incoming virtual machine of a second application of the system and instantiating said incoming virtual machine when said system is initiated in order to initialize a communication channel between the incoming virtual machine and the outgoing virtual machine without instantiating virtual machines of said second application other than said incoming virtual machine; and instantiating, by said incoming virtual machine, said other virtual machines of said second application in response to receiving an actionable request from said outgoing virtual machine for one or more services provided by said second application.

2. The method of claim 1, wherein said outgoing and incoming virtual machines comprise corresponding virtual machine connectors.

3. A non-transitory computer program product for performing the steps of claim 1.

4. In a computing environment comprising one or more physical computing devices, a method of assembling virtual machines residing on the one or more physical computing devices together as a system instantiated for a common computing goal, comprising:

configuring pluralities of said virtual machines together as assemblies, each assembly instantiable to provide a tessellated application, wherein said tessellated applications are interconnected to form said system for accomplishing said common computing goal and each virtual machine is configured for implementing a defined role without overlap in functionality with respect to the common computing goal, further including validating the system for compliance with a predetermined computing policy with respect to the common computing goal, such validation occurring on formation and on any instance of alteration or reconfiguration of any portion of said system;

conditionally linking at least two applications of said system together, said conditionally linking including defining an outgoing virtual machine of a first application of the system and an incoming virtual machine of a second application of the system and instantiating said incoming virtual machine when said system is initiated in order to initialize a communication channel between the incoming virtual machine and the outgoing virtual machine without instantiating virtual machines of said second application other than said incoming virtual machine; and instantiating, by said incoming virtual machine, said other virtual machines of said second application in response to receiving an actionable request from said outgoing virtual machine, wherein the outgoing virtual machine delivers said actionable request if said first application requires one or more services provided by said second application or requires said second application to implement said predetermined computing policy.

5. The method of claim 4, further including said outgoing virtual machine delivering said actionable request.

6. The method of claim 5, further including said second application providing said one or more services or implementing said predetermined policy as determined by said actionable request.

7. The method of claim 4, further including defining respective virtual machine connectors in said incoming virtual machine and said outgoing virtual machine.

8. The method of claim 7, wherein said virtual machine connector of said incoming virtual machine comprises an incoming virtual machine connector and said virtual machine connector of said outgoing virtual machine comprises an outgoing virtual machine connector.

9. A non-transitory computer program product for performing the steps of claim 4.

10. A computing environment comprising one or more physical computing devices, a network of component virtual machines residing on the one or more physical computing devices and assembled together as a system instantiated for a common computing goal, comprising:

a plurality of tessellated applications each defined by a plurality of virtual machines configured as an assembly, wherein said tessellated applications are interconnected to form said system to accomplish said computing goal and each virtual machine is configured for implementing a defined role without overlap in functionality with respect to accomplishing the common computing goal, wherein the system is validated for compliance with a predetermined computing policy with respect to the common computing goal, such validation occurring on formation and on any instance of alteration or reconfiguration of any portion of said system; and a communication channel between an outgoing virtual machine of a first application of said system and an incoming virtual machine of a second application of said system, wherein said incoming virtual machine is instantiated when said system is initialized to satisfy connectivity issues between said first and second applications without instantiating virtual machines of said second application other than said incoming virtual machine in the network, wherein said incoming virtual machine is further configured to instantiate said other virtual machines of said second application upon receiving from said outgoing virtual machine an actionable request for one or more services provided by said second application or to implement the predetermined computing policy.

11. The computing environment of claim 10, wherein the communication channel defines a connection between the outgoing virtual machine and the incoming virtual machine.

12. The computing environment of claim 11, wherein said incoming virtual machine being instantiated when said system is initialized provides a computing front to said first application to allow for the successful establishment of the communication channel without instantiating virtual machines of said second application other than said incoming virtual machine until receipt of said actionable request.

13. The computing environment claim 11, further including a template library storing defined virtual machine templates corresponding to said virtual machines.

14. The computing environment claim 13, wherein said defined virtual machine templates which correspond to said outgoing virtual machine and said incoming virtual machine include respectively a defined outgoing virtual machine connector and a defined incoming virtual machine connector.

15. A computing environment comprising one or more physical computing devices, a network of component virtual machines residing on the one or more physical computing devices and assembled together as a system instantiated for a common computing goal, comprising:

a plurality of tessellated applications each defined by a plurality of virtual machines configured as an assembly, wherein said tessellated applications are interconnected according to a predetermined computing policy to form said system to accomplish said computing goal and each virtual machine is configured for implementing a defined role without overlap in functionality with respect to accomplishing the common computing goal; and a communication channel between an outgoing virtual machine of a first application of said system and an incoming virtual machine of a second application of said system, said incoming virtual machine being instantiated when said system is initialized to provide a computing front to said first application to successfully establish the communication channel without instantiating virtual machines of said second application other than said incoming virtual machine, wherein said incoming virtual machine is further configured to instantiate the other virtual machines of said second application upon receiving from said outgoing virtual machine an actionable request for one or more services provided by said second application or to implement the predetermined computing policy.

16. The computing environment of claim 15, further including a template library storing a defined outgoing virtual machine connector and a defined incoming virtual machine connector.

17. The computing environment of claim 15, further including a non-transitory computer program product having computer executable instructions to implement said plurality of virtual machines tessellated together as said assembly on the one or more physical computing devices.

18. A method of using a network of virtual machines residing on one or more physical computing devices, said network of virtual machines configured as a system instantiated for a common computing goal, comprising:

configuring pluralities of said virtual machines together as assemblies, each assembly instantiable to provide a tessellated application, wherein said tessellated applications are interconnected to form said system for accomplishing said common computing goal and each virtual machine is configured according to a predetermined computing policy for implementing a defined role without overlap in functionality with respect to the common computing goal;

conditionally linking at least two applications of said system together, said conditionally linking including defining an outgoing virtual machine of a first application of the system and an incoming virtual machine of a second application of the system, wherein said outgoing virtual machine and incoming virtual machine are connected by corresponding predefined virtual machine connectors, said conditionally linking further including instantiating said incoming virtual machine when said system is initiated in order to initialize a communication channel between the incoming virtual machine and the outgoing virtual machine without instantiating virtual machines of said second application other than said incoming virtual machine; and instantiating, by said incoming virtual machine, said other virtual machines of said second application in response to receiving an actionable request from said outgoing virtual machine for one or more services provided by said second application or to implement said predetermined computing policy.

19. A non-transitory computer program product for performing the steps of claim 18.

* * * * *